United States Patent
McMillin et al.

[11] Patent Number: 6,142,163
[45] Date of Patent: Nov. 7, 2000

[54] METHOD AND APPARATUS FOR PRESSURE CONTROL IN VACUUM PROCESSORS

[75] Inventors: Brian K. McMillin, Fremont; Farro F. Kaveh, Palo Alto; Michael S. Barnes, San Francisco, all of Calif.

[73] Assignee: LAM Research Corporation, Fremont, Calif.

[21] Appl. No.: 09/053,530

[22] Filed: Mar. 31, 1998

Related U.S. Application Data

[63] Continuation-in-part of application No. 08/627,712, Mar. 29, 1996, Pat. No. 5,758,680.

[51] Int. Cl.⁷ .............................. F16K 17/34; F17D 1/16
[52] U.S. Cl. ........................ 137/14; 137/487.5; 137/114
[58] Field of Search ................................. 137/14, 487.5, 137/114; 437/7; 216/59; 156/345; 118/710, 692, 715; 604/118, 119

[56] References Cited

U.S. PATENT DOCUMENTS

| | | |
|---|---|---|
| 4,253,480 | 3/1981 | Kessel et al. . |
| 4,394,871 | 7/1983 | Czajka et al. . |
| 4,539,967 | 9/1985 | Nakajima et al. ................. 137/487.5 |
| 4,702,273 | 10/1987 | Allen, Jr. et al. . |
| 4,720,807 | 1/1988 | Farran et al. . |
| 4,798,521 | 1/1989 | Schmidt et al. . |
| 4,911,103 | 3/1990 | Davis et al. ............................ 118/715 |
| 4,949,670 | 8/1990 | Krogh . |
| 4,961,441 | 10/1990 | Salter . |
| 5,020,176 | 6/1991 | Dotson . |
| 5,020,564 | 6/1991 | Thoman et al. . |
| 5,031,674 | 7/1991 | Mack . |
| 5,220,940 | 6/1993 | Palmer . |
| 5,292,370 | 3/1994 | Tsai et al. . |
| 5,365,772 | 11/1994 | Ueda et al. . |
| 5,534,069 | 7/1996 | Kuwabara et al. . |
| 5,725,672 | 3/1998 | Schmitt et al. ......................... 119/715 |
| 6,063,198 | 5/2000 | Bang et al. ............................ 118/715 |

FOREIGN PATENT DOCUMENTS

| | | |
|---|---|---|
| WO 96 13287 | 5/1996 | WIPO . |
| WO 97 37161 | 10/1997 | WIPO . |

*Primary Examiner*—Gregory L. Huson
*Assistant Examiner*—Joanne Y. Kim
*Attorney, Agent, or Firm*—Pennie & Edmonds LLP

[57] ABSTRACT

A method and apparatus is disclosed for controlling the pressure of a reaction chamber in wafer processing equipment. The disclosed apparatus and method uses a ballast port for inserting gas into the evacuation system, thereby controlling the pressure in the reaction chamber. The disclosed apparatus and method further uses estimation curves to estimate the desired position of a controlled gate valve which is located between the reaction chamber and turbo pump. The disclosed apparatus and method achieves a set point pressure by prepositioning a throttle valve followed by repositioning the throttle valve based on the difference between a measure pressure and the set point pressure using proportional and integral control, wherein enablement of integral control is delay for a pre-specified period.

39 Claims, 9 Drawing Sheets

METHOD AND APPARATUS FOR PRESSURE CONTROL IN VACUUM PROCESSORS

CROSS-REFERENCE TO RELATED APPLICATIONS

This application is a continuation-in-part of U.S. application Ser. No. 08/627,712, filed Mar. 29, 1996, now U.S. Pat. No. 5,758,680 the content of which is incorporated herein in its entirety by reference.

BACKGROUND OF THE INVENTION

1. Field of the Invention

This invention relates to the field of semiconductor wafer processing, and in particular to a method and apparatus for controlling the reaction chamber pressure in semiconductor wafer processing equipment.

2. Description of the Related Art

Fully automated wafer processing systems are currently in widespread commercial use. In such systems, wafers are robotically transported into and out of a reaction chamber or process chamber where, under a controlled evacuated environment, various processes are carried out. One example of such a wafer processing system is the TCP™ 9400 single-wafer plasma etching system manufactured by Lam Research Corporation.

In the case of plasma etching, semiconductor wafers are etched in the reaction chamber by exposing the wafer to ionized gas compounds (plasma) under very low pressures. Typically, during processing, pressures below one Torr need to be maintained in the reaction chamber. Process recipes consist of a series of steps controlling gas flow rates, chamber pressure, RF power, gap spacing, chamber temperature, and wafer temperature. Preprogrammed sets of process recipes are typically provided from the manufacturer. The operator may either select a programmed recipe or use an altered or customized recipe.

When the etching process starts, selected gases used for processing are mixed and introduced into the reaction chamber at rates according to the process recipe. RF power is delivered by a coil in the upper part of the reaction chamber and is tuned so as to ionize the process gases. RF power is also delivered to the wafer and is tuned so as to induce a DC bias on the wafer thereby controlling the direction and energy of ion bombardment of the wafer. During the etching process, the plasma reacts chemically with the wafer surface to remove material not covered by a mask. The plasma and RF electrical field are completely contained within the reaction chamber. An evacuation system continuously removes gases from the reaction chamber, and thereby maintains the desired pressure. The evacuation system typically comprises a turbo pump separated from the reaction chamber by a control gate valve. A pressure controller uses pressure data from a manometer in the reaction chamber to adjust the degree of closure position of the control gate valve. The pressure controller opens and closes the gate valve to increase and decrease the vacuum supplied from the turbo pump to the reaction chamber. In this way, the pressure controller attempts to maintain the desired pressure in the reaction chamber as the gas flow rates into the reaction chamber vary from one process step to the next.

The pressure controller compares the data from the reaction chamber manometer with the set point values programmed in the recipe. If either the process gas flow rate, or the desired pressure in the reaction chamber changes greatly from one process step to the next, the pressure controller may not be able to adjust the gate valve position appropriately. For example, if the next process step requires the gas to be introduced at much higher flow rates, the gate valve may initially over or under compensate, resulting in the wrong pressure in the reaction chamber at the beginning of the step. To alleviate this problem, currently available systems perform a learn procedure each time a new recipe is used. The learn procedure creates a table of the approximate gate valve positions required for each process step in the new recipe. During the learn procedure, dummy wafers are processed according to the process steps of the recipe, and the controller notes the gate valve positions required for each step.

One problem with the current systems is that a new learn procedure is required every time a new process recipe is used on a machine. Thus, when the operator alters the recipe by changing the set point pressure or gas flow of one of the process steps, he necessarily incurs the time and expense of deriving a new table. Running new learn procedures can be particularly time consuming when experimenting with new recipes.

Another problem with the current systems is that the results from the learn procedure will be invalid if any of the gas supply valves or instruments are incorrectly tuned or calibrated. For example, if one of the gas inflow valves is incorrectly calibrated during the learn procedure, the resulting table of gate positions will also be incorrect. Furthermore, the error in the table may not be detected until several wafers are incorrectly processed.

Another problem with the currently available systems is related to the movement of the gate valve itself. During processing, a certain amount of waste material generated from the etching process collects on the surface of the gate valve. Whenever the gate valve position is changed, particulate matter is released in the surrounding environment. Due to the extremely low operating pressures, back diffusion may carry the particles back upstream to the reaction chamber, where undesirable contamination of the wafer may occur.

A further limitation with the current systems is that the transition time or stabilization time may sometimes be undesirably long. The transition or stabilization time is the time required to stabilize the pressure in the reaction chamber to the pressure set point for a processing step. In particular, when the chamber starts out at relatively low pressure, such as at the beginning of processing, and the next step requires a relatively high pressure, such as 80 mTorr, the stabilization time typically takes around 20 seconds depending on the set point gas flow. According to the current practice, chamber stabilization is achieved by introducing the process gases into the reaction chamber at the set point flow rates required by the next processing step. Thus, in cases where the next processing step requires a relatively low flow, and the chamber pressure must be increased substantially, the stabilization time is often undesirably long.

SUMMARY OF THE INVENTION

Thus, it is an object of this invention to improve the present technique of pressure control in the field of wafer processing by minimizing the movement required by the gate valve during processing, thereby minimizing the amount of particulate waste material introduced into the reaction chamber.

It is a further object of this invention to improve the present technique of pressure control in the field of wafer processing by eliminating the need for performing a learn procedure whenever the set point pressure or gas flow rates are substantially changed for a particular process step or whenever a new recipe is used.

It is a further object of this invention to improve the present technique of pressure control in the field of wafer processing by significantly reducing the stabilization or transition time required for certain process steps having a set point pressure significantly higher or lower than that of the previous step.

In order to meet these and other objectives, the present invention is directed to a method and apparatus wherein the pressure in the processing chamber is controlled by introducing a ballast gas into the evacuation system and the flow rate of ballast gas is adjusted according to the measured pressure in the processing chamber.

Also in order to meet these objectives, the present invention is directed to a method and apparatus wherein the set point pressure and process gas flow are retrieved for a particular process step and the gate valve position is estimated by referencing gate valve position estimation curves stored in memory which correlate chamber pressures, gas flows, and gate valve positions.

Also in order to meet these objectives, the present invention is directed to a method and apparatus for raising the pressure in the processing chamber to the set point level wherein the process gas is initially introduced at a first predetermined flow rate which is higher than the set point flow rate, and after a predetermined amount of time or upon sensing of the pressure of the processing chamber approaching the set point level, the gas introduction rate is re-set to the set point level.

Also in order to meet these objectives, the present invention is directed to a method and apparatus wherein the set point pressure and process gas flow are retrieved for a particular process step, a gate valve used to adjust pressure, is pre-positioned after which the gate valve is adjusted using proportional and integral control based on the difference between the measured and set point pressures. However, integral control is not enabled until after a predetermined point has been reached. This prevents over/undershooting the desired pressure caused by integrator windup.

DETAILED DESCRIPTION OF THE INVENTION

The following embodiments of the present invention will be described in the context of an automated single-wafer plasma etching system, although those skilled in the art will recognize that the disclosed methods and structures are readily adaptable for broader application. For example, the invention is readily adaptable to other types of wafer processing equipment and vacuum processing equipment. Note that whenever the same reference numeral is repeated with respect to different figures, it refers to the corresponding structure in each such figure.

Figure 1:
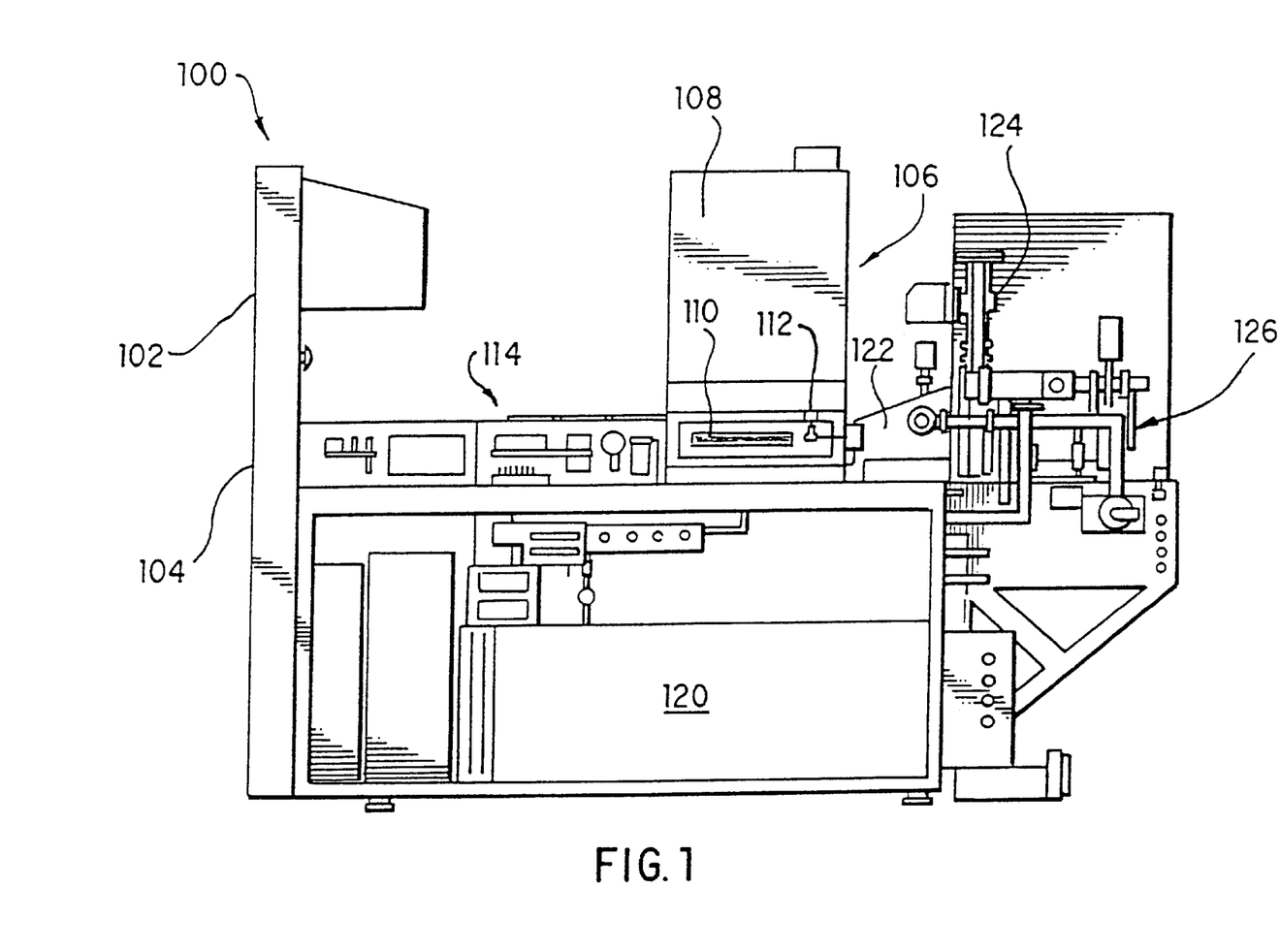
FIG. 1 is a right side view showing some of the major assemblies of a wafer processing machine according to the present invention.

A plasma etching system 100 is illustrated in FIG. 1, according to the present invention. It should be noted that the present invention is illustrated by way of example in FIGS. 1–2 as used with the TCP™ 9400 single-wafer plasma etching system manufactured by Lam Research Corporation. Based on the teaching set forth herein, a person of ordinary skill may readily utilize the present invention with any suitable vacuum or wafer processing equipment which requires control and manipulation of processing pressures in an evacuated environment.

As shown in FIG. 1, etching system 100 comprises an operator interface and control panel 102, from which the operators monitor and control the various processes and features of the etching system. Sender and receiver wafer indexers 104 send and receive wafers to and from the other processing assemblies in etching system 100. In the case of the TCP™ 9400, the wafers are robotically transported from the send indexer along the left side of the etching system to an entrance loadlock (not shown). From the entrance loadlock, wafers are placed into the reaction chamber 106, where the plasma etching process takes place. Shown in FIG. 1 is the upper chamber housing 108, quartz window 110, and chamber manometer 112. After processing, the wafers enter the exit loadlock 114, and are transported back to indexers 104. Also shown in FIG. 1 are gas box 120, plenum 122, gate valve 124, and turbo pump 126, all of which will be described in greater detail below.

Figure 2:
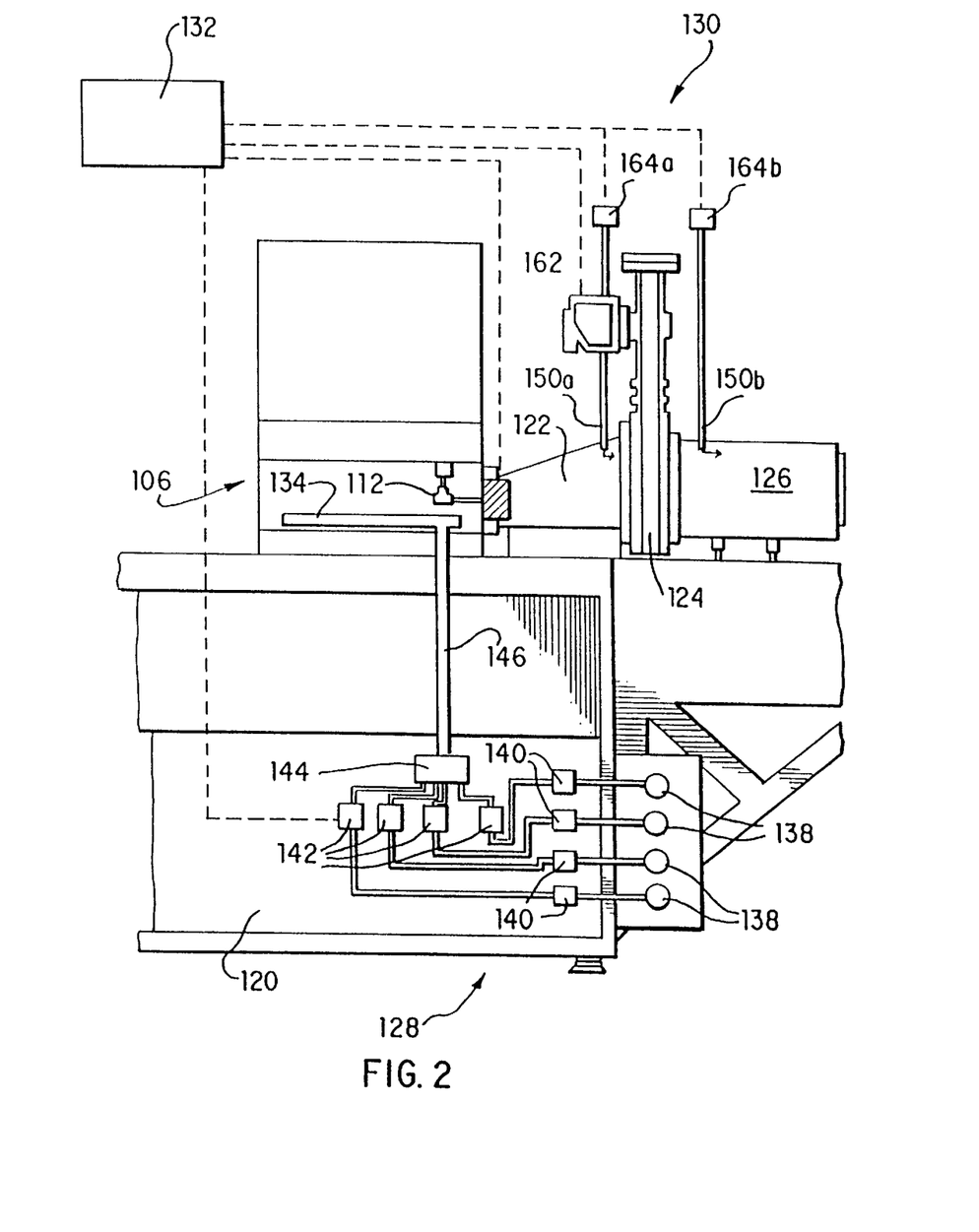
FIG. 2 is a schematic depicting a gas delivery system, reaction chamber, and evacuation system of a wafer processing machine according to the present invention.

FIG. 2 illustrates, in schematic form, reaction chamber 106, gas delivery system 128, exhaust system 130, and control system 132. During the etching process, a wafer is placed or clamped on a lower electrode assembly within reaction chamber 106. To maintain a controlled wafer-etch environment, reaction chamber 106 is kept under vacuum at all times except during maintenance. Exhaust system 130 serves to maintain this vacuum by evacuating gas from the reaction chamber.

Gas delivery system 128 introduces process gasses into reaction chamber 106 through a gas ring 134, which comprises a plurality of gas outlets arranged in a ring about the lower electrode assembly and the wafer. Gas delivery system 128 is under the control of control system 132. Gas delivery system 128 supplies process gases to the reaction chamber via multiple gas flow paths which comprise manual shut-off valves 138, primary shut-off valves 140, mass-flow controllers 142 and gas-mixing manifold 144. Although four separate gas flow paths are shown in FIG. 2, in general any number of gas flow paths may be used according to the needs of a particular application. From gas-mixing manifold 144, the process gases pass through process gas line 146 and then into reaction chamber 106 via gas ring 134.

Control system 132 directs gas panel interface 136 to open and close the mass-flow controllers 142 to regulate the flow of gases to the gas-mixing manifold 144. According to currently available systems, during a stabilization step or a transition between two steps requiring an increase or decrease in set point pressure, the control system would direct the mass flow controllers to simply set the flow of gases to the flow rate required by the next step. However, according to the present invention, it has been found that for steps requiring an increase in pressure, the speed of response is a strong function of the gas inflow rate. Thus, according to one alternative embodiment of the present invention, stabilization time or transition time may advantageously be reduced by initially directing the mass-flow flow controllers to flow rates much greater than may be required for the next etching step. Furthermore, it has been found that this increased gas flow rate during stabilization has minimal detrimental effect on the process, because the RF power is not being used during the stabilization step.

Figure 3:
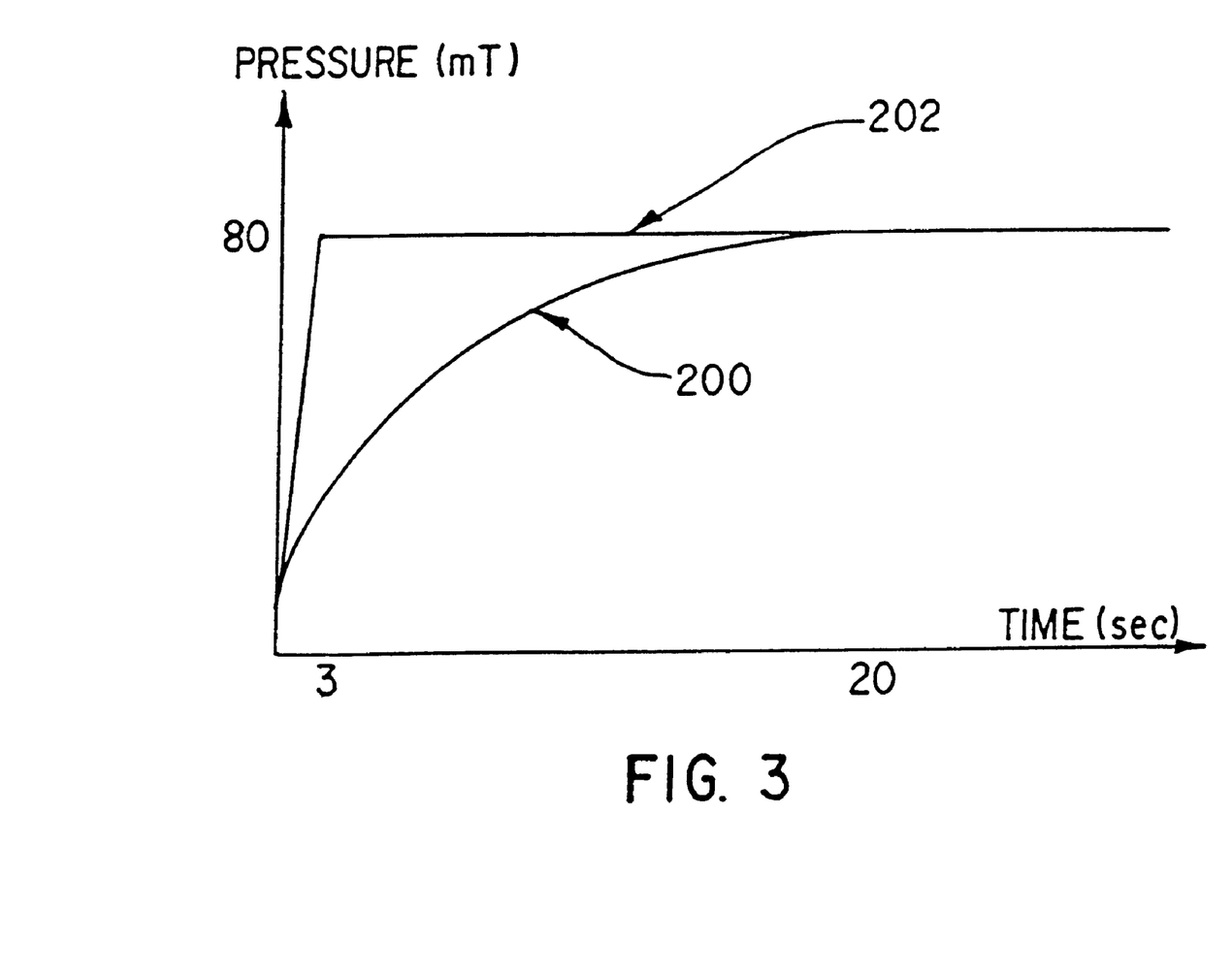
FIG. 3 is a graph illustrating examples of stabilization times under prior art methods and according to the present invention.

FIG. 3 shows examples of curves which illustrate the stabilization or transition time under the prior art method, 200, and the method according to the present invention, 202. In the example of FIG. 3, the reaction chamber needs to be raised from only a few mTorr to a process step requiring 80 mTorr pressure and a set point flow rate of 40 SCCM. Using conventional methods, as shown in curve 200, the gas is simply introduced at the set point of 40 SCCM, and the stabilization time is approximately 20 seconds. Using one alternative embodiment of the method and apparatus according to the present invention, as shown in curve 202, introducing the process gas during stabilization initially at a rate of 320 SCCM results in a stabilization time of only about 3 seconds. Such a decrease in stabilization time translates into a substantial increase in throughput.

Other rates of introduction may be used depending on the process requirements and the resulting benefit of increased throughput. In general the stabilization time multiplied by the flow rate will be directly proportional to the change in pressure. Using this relationship, for a desired increase in pressure, an appropriate flow rate may be chosen to decrease the stabilization time.

Figure 4:
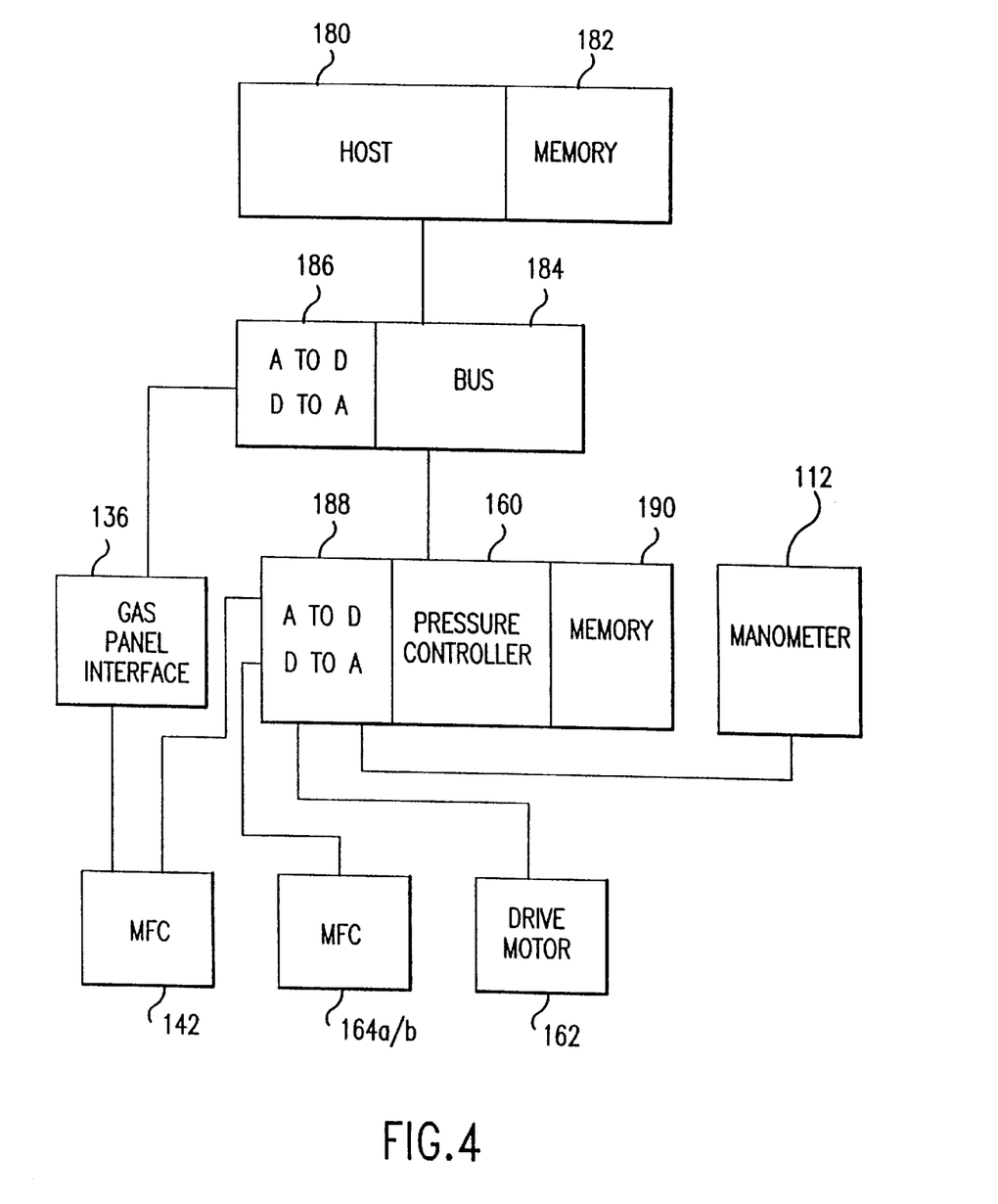
FIG. 4 is block diagram illustrating some components of a control system and various interconnections between such components according to the present invention.

Referring now to FIG. 4, a block diagram of control system 132 is illustrated, which comprises host computer 180, bus 184, gas panel interface 136 and pressure controller 160. Host computer 180 is connected to a memory 182, which typically stores the process recipes in the form of a table of process steps, and the corresponding chamber pressures, process gas flow rates, RF power settings, gap spacings and temperature settings for each process step. Bus 184 typically comprises a standard bus, such as VMEbus, which communicates with the host 180 via a local area network such as ethernet. Gas panel interface 136 communicates with bus 184 typically via analog lines and D to A and A to D converters residing on bus 184. Through gas panel interface 136 and bus 184, host 180 may set flow rates and read flow settings to and from mass flow controllers 142. However, according to the present invention, mass flow controllers 142 are also controllable by pressure controller 160 via converters 188. Pressure controller 160 communicates with the bus 184 via RS232 connection or the like. Pressure controller 160 receives pressure readings from manometer 112, controls gate valve drive motor 162, and controls ballast gas mass flow controller 164a or 164b (explained in more detail below).

The increased inflow of process gas into the reaction chamber may be controlled by either pressure controller 160 or by host 180. In the case where pressure controller 160 controls the inflow of process gas, pressure controller 160 sets the inflow to a high flow rate and monitors the pressure in reaction chamber 106 through chamber manometer 112. When the pressure in reaction chamber 106 comes within some range of the pressure required for the following process step, pressure controller 160 re-sets mass flow controllers 142 to introduce gas at the set point rate of the following process step. A suitable threshold pressure for re-setting the flow rates to the set point flow rate should be chosen for each particular configuration of equipment so that smooth coasting to the set point pressure is obtained. For example, it has been found on some machines that when the pressure is within about 10% of the set point pressure, the flow rate should be re-set to the set point flow rate.

Alternatively, the host 108 may control the gas inflow rates via gas panel interface 136. When controlled from the host, the process gas is introduced at a high rate for a time t, after which the flow rates are re-set to the set point levels. It has been found that the proper time t, for changing the flow rate from the high level to the set point level, can be established through experiment, by running a dummy wafer through once and monitoring the time required to reach the set point pressure. The time t, may also be calculated by using a relationship that has been established through simple modeling of the chamber, as shown below:

$$P = \alpha \dot{m} * t \rightarrow t = P/\dot{m}\alpha$$

The value of alpha varies with the particular configuration of equipment; a value of approximately 0.3 has been found for an experimental machine manufactured by Lam Research Corporation.

Thus, according to an alternative embodiment of the present invention, the stabilization time and the transition time during pressure step changes may be significantly shortened, thereby making the process more efficient and increasing throughput.

Referring again to FIG. 2, the evacuation system 130 will be described in greater detail. The evacuation system 130 serves to create a vacuum in the reaction chamber 106. Evacuation system 130 comprises plenum 122, gate valve 124, turbo pump 126, and ballast ports iii and bi. As shown in FIG. 2, plenum 122 communicates directly with reaction chamber 106. Between plenum 122 and turbo pump 126 is gate valve 124. Note that although valve 124 is shown and referred to as a gate valve, those of ordinary skill in the art will recognize that many alternative types of valves may be used which have a throttling effect on the flow of gas between the process chamber and the vacuum pump. Such valves include, for example, butterfly valves, vane-type valves, louvered-type valves, and iris-type valves.

Additionally, the evacuation system 130 may also comprise a backing pump (not shown) which is used to initially pump down reaction chamber 106 from atmospheric pressure to a rough vacuum pressure of about 1 mTorr. Control system 132 coordinates opening and closing isolation valves that connect each pump to the chamber so that turbo pump 126 continues to reduce pressure when the backing pump reaches its low pressure limit. Once the backing pump has pumped down the chamber to its low-pressure limit, turbo pump 126 is engaged to reduce the chamber pressure to less than 1 mTorr.

In currently available systems, pressure controller 160 uses pressure data from chamber manometer 112 to open and close the gate valve 124 in order to control the pressure in reaction chamber 106. However, according to an alternative embodiment of the present invention, it has been found that the pressure in reaction chamber 106 may be controlled by introducing a ballast gas into the turbo pump through the ballast port. In FIG. 2, ballast port 150a and ballast port 150b illustrate two alternative placements of a ballast port. Ballast port 150a is placed immediately upstream from gate valve 124; ballast port 150b is positioned downstream from gate valve 124 and inserts ballast gas directly into turbo pump 126. In general, it is preferred that the placement of the ballast port be as far downstream as possible, to reduce the possibility of ballast gas back diffusing into the reaction chamber and interfering with the process. In the case of ballast port 150b, the ballast gas may preferably be forced directly into one of the stages of the turbo pump, thereby greatly reducing the possibility of back diffusion. It is also preferable to use as a ballast gas a neutral gas such as nitrogen which may also be used for other purposes in the system operation or maintenance.

The flow rate of the ballast gas is preferably controlled by a mass flow controller, under the direction of control system 132. Mass flow controllers 164a and 164b control the flow rate of ballast gas for ballast ports 150a and 150b respectively. As shown in FIG. 4, mass flow controllers 164a and 164b are controlled by pressure controller 160.

The introduction of ballast gas through the ballast port may advantageously be used to increase the speed of response during pressure set point changes, as well as active control of the chamber pressure in place of moving the gate valve. During operation, the ballast gas introduction may precisely control the pressure in the chamber over a substantial range of operating pressures, advantageously reducing the need for gate valve position changes. The gate valve may be positioned in a few predetermined fixed positions, thereby extending the range of control by the ballast gas over the entire operating range of reaction chamber pressures. For example, it has been found in certain machines manufactured by Lam Research Corporation that using the ballast gas in combination with positioning the gate valve in three different positions, e.g., fully open, two-thirds closed and fully closed, provides coverage of an adequate range of conductances for the evacuation system.

Thus, a ballast gas may advantageously be introduced via a ballast port directly into or immediately upstream from the turbo pump, thereby effectively controlling the pressure of the reaction chamber without the need for adjusting the process gas inflow rate, or adjusting the turbo pump speed thus, minimizing the amount of required movement of the gate valve. By minimizing the movement of the gate valve, the amount of particulate matter introduced and the chances of particulate contamination of the process are greatly reduced.

Figure 5:
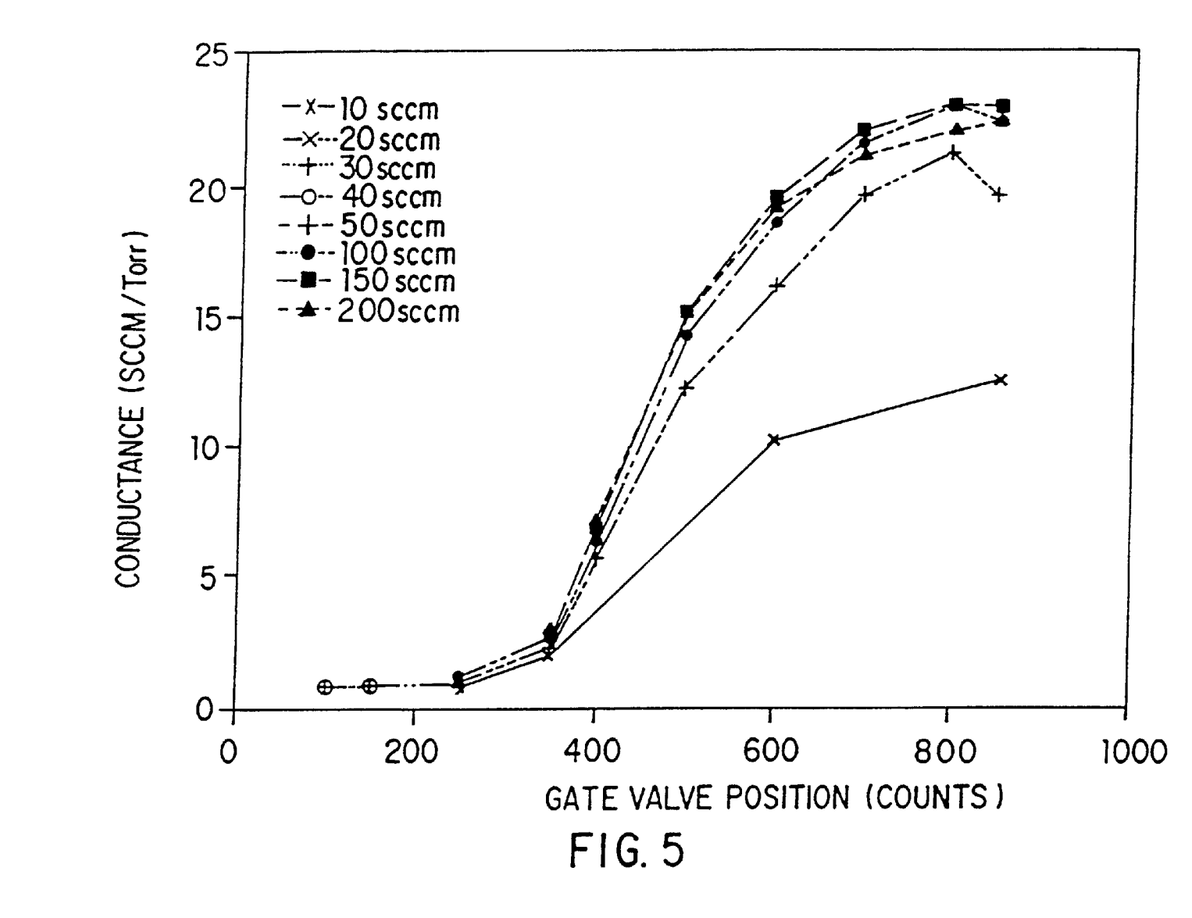
FIG. 5 is a graph illustrating examples of gate valve position estimation curves according to the present invention.

According to another alternative embodiment of the present invention, a number of conductance curves may be used to estimate the position of the gate valve for a given flow rate and pressure set point, thereby eliminating the need for performing a learn procedure whenever a change in set point pressure or flow is made for a particular step or whenever a new recipe is used. FIG. 5 illustrates examples of such gate valve estimation curves. In particular, a family of curves is shown for various flow rates. It has been found that the curves tend to converge at high flow rates; in the case of FIG. 5, the curves tend to converge at flow rates above 100 SCCM.

A preferred method of deriving the gate position estimation curves is as follows. For each flow rate, step through a sequence of gate valve positions and measure the resultant pressure for each position. The flow rate divided by the measured pressure is the conductance for that gate valve position. Repeat this process for each flow rate. It has been found that once the gate position estimation curves are derived, they remain accurate absent some drastic change in the turbo pump or the gate valve. Thus, according to the invention, the curves may be permanently stored in the memory of the control system. In FIG. 4, memory 190 is shown as part of pressure controller 160 and is preferably used to store the gate position estimation curves. For example, the curves may be stored in memory 190 in the form of a matrix or array of values, or in the form of formulas or functions which have been fitted to the experimentally derived curves.

Gate valves and controllers currently available typically operate in either pressure control mode or position control mode. In pressure control mode the controller monitors the pressure in the chamber and tries to maintain the set pressure by adjusting the position of the gate valve, while in position control mode the controller simply positions the gate valve to a set position. According to an alternative embodiment of the present invention, initially the gate valve should be operated in position control mode, which prepositions the valve to a point suitable to bring the system near the pressure set point. The position controller may estimate the preposition point from the gate position estimation curves stored in memory. For example, if the process set point is 20 mTorr pressure with 100 SCCM flow, the pressure controller estimates the gate position from the curve stored in memory. In the case of FIG. 5, the position would be approximately 380. When the pressure is within a small percentage of the set point, the pressure controller is preferably switched to pressure control mode. For example, it has been found in some machines that when the pressure controller is switched to pressure control mode when the pressure is within 5% of the set point pressure, smooth coasting to the set point pressure generally occurs.

The gate valve position estimation curves may also be used when controlling the pressure using ballast gas. In order to cover a wider range of conductances, the gate valve may be set in a small number of preselected positions. The gate valve estimation curves may be used to select which gate valve position is best for a particular process step. In general for a system, a certain range of ballast flow is optimal for controlling the pressure in the reaction chamber. Assuming a ballast gas flow near the mid-point of the suitable range of ballast gas flow rates, adding that rate to the set point rate, and then dividing the combined flow rate by the set point pressure will yield a conductance value. This conductance value will indicate, when using the gate valve position estimation curves, which of the few preselected gate valve positions is appropriate. For example, suppose the range of ballast gas flow is 0–300 SCCM for a given configuration, the process gas flow set point is 50 SCCM, and chamber pressure set point is 15 mTorr. Then 150 SCCM, the middle of the range of ballast gas, added to the set point flow and divided by the pressure yields a conductance of about 13.3 SCCM/mTorr. Using the curves in FIG. 5, the ideal gate position would be about 500, and the nearest preselected position should be chosen. In the case of using three preselected gate positions, wide-open, fully closed, and two-thirds closed, the position of two-thirds closed would be chosen.

The gate valve position curves which represent the system pumping speed as a function of valve closure, also known as pumping speed correlation functions are established under conditions which approximate actual process conditions. Since the conditions approximate actual conditions, the valve position curves have a certain amount of inherent error when used for valve positioning and pressure control under actual process conditions. Differences that may exist between curve "establishing" conditions and actual process conditions include the ratio of the specific heats, molecular weights, temperatures and the like. For certain processes this inherent error does not significantly affect pressure stabilization times but in others it may lead to undesirably long settling times. One solution would be to generate many valve position curves under many different conditions. An alternative and more preferred solution is, to use a single correlation curve and account for the error within the pressure control scheme thus, significantly reducing the time consuming process of establishing many correlation curves.

Thus, in another alternative embodiment of the present invention, the valve position estimation curve is used in order to preposition the valve based on the current flow set point and a predetermined fraction of the pressure set point. The fraction is chosen to ensure that the pressure will increase monotonically towards the set point for the process requiring an increase in pressure, and that the pressure will decrease monotonically toward the set point for process steps requiring a decrease in pressure, without exhibiting overshoot or undershoot, respectively. Using a predetermined fraction of the pressure set point is advantageous in preventing pressure overshoots/undershoots due to the inherent error within gate valve position estimation curves, as discussed above. In general, the predetermined fraction will range between about 50 to 150% of the pressure set point and preferably between about 70 to 130%. A value less than 100% applies to steps in which the pressure set point is increased, and a value greater than 100% applies to steps in which the pressure set point is decreased.

In another alternative embodiment of the present invention the valve estimation curves are used in order to preposition the valve based on a calculated effective inflow, wherein the effective inflow is determined by combining the equation for conservation of mass, the stored pumping speed correlation and the measured pressure. In this alternative embodiment, the valve is positioned to any suitable initial position and after the flow is stabilized the effective inflow is calculated by using the mass conservation equation for the chamber:

$$m_{in} - m_{out} = V \cdot d\rho_{mix}/dt.$$

Where $M_{in}$ is the mass flow rate into the chamber, $m_{out}$ is the mass flow rate out of the chamber, V is the chamber volume and $d\rho_{mix}/dt$ is the time derivative of the gas density within the chamber. Substituting for the mass flow rate in terms of the density and volumetric flow rate at standard conditions and using the ideal gas law, the conservation of mass equation reduces to:

$$\frac{M_{in}}{M_{out}} \cdot Q_{in} - Q_{out} = \frac{V \cdot T^{STP}}{P^{STP} \cdot T_{mix}} \cdot \frac{dP_{mix}}{dt}.$$

Where M is the molecular weight, the subscript "mix" refers to the gas within the chamber, P is the gas pressure and T is the gas temperature. It has been implicitly assumed that $dT_{mix}/dt=0$ and that $M_{mix} \approx M_{out}$. By defining effective in-flow, $Q_{in}^{eff} = Q_{in} \cdot M_{in}/M_{out}$, and setting the parameter $\beta = p^{STP} \cdot T_{mix}/V \cdot T^{STP}$, the equation simplifies to:

$$Q_{in}^{eff} - Q_{out} = \beta \cdot dP_{mix}/dt.$$

The parameter $\beta$ can be evaluated using the known or estimated chamber volume and a measured or estimated value for $T_{mix}$.

Figure 6:
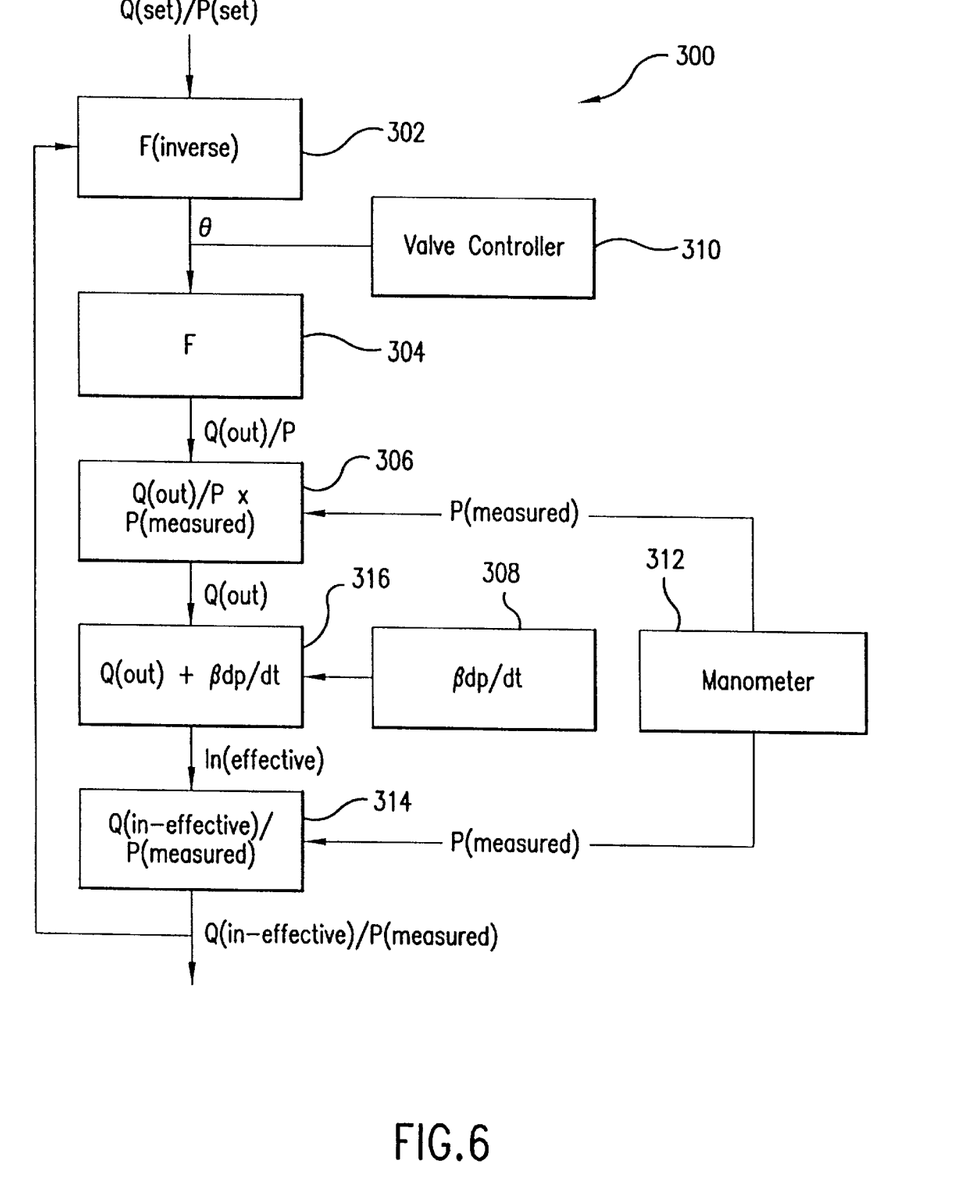
FIG. 6 is a flow diagram illustrating an alternative pressure control scheme according to the present invention.
Figure 7A:
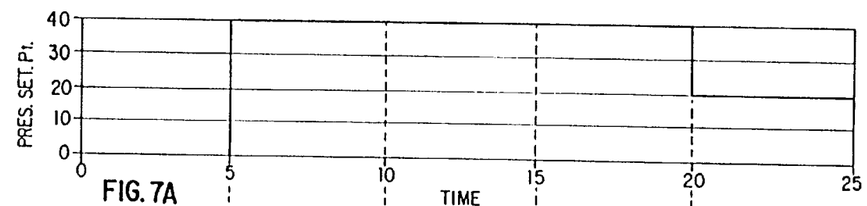
FIG. 7 shows characteristic time traces of pressure and dP/dt following pressure set point changes.
Figure 7B:
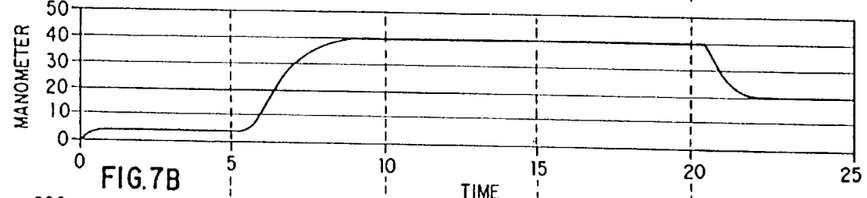
Figure 7C:
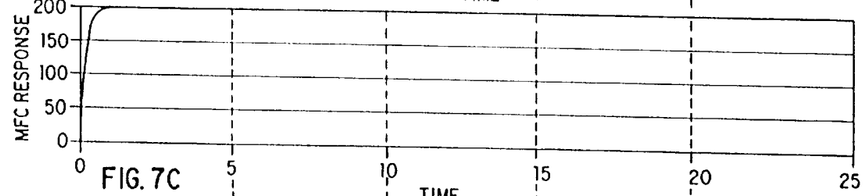
Figure 7D:
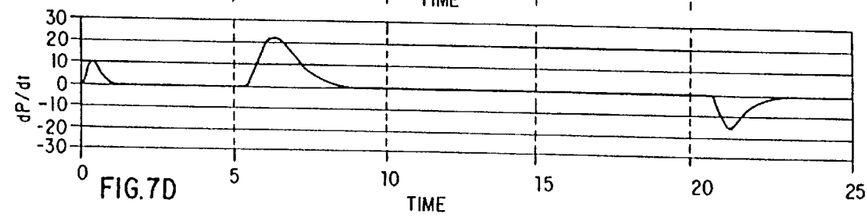

Referring to FIG. 6, 300 refers to a valve prepositioning control loop according to an alternative embodiment of the present invention. Box 302 represents the inverse of the gate valve position estimation curve. An input of Q/P into box 302 results in a corresponding valve position θ. Box 304 represents the gate valve position estimation curve where an input of a valve position results in a corresponding Q/P value. Box 308 outputs β (dP/dt). In this alternative embodiment of the present invention, $Q_{set}/P_{set}$, known from the recipe or elsewhere, is input into box 302, which, using the inverse gate valve position estimation curve, outputs a first valve position, $\theta_f$. $\theta_f$ is input into box 304 and valve controller 310. Valve controller 310 adjusts the valve position accordingly and box 304, using the gate valve position estimation curve, outputs $Q_{out}/P$, where $P \approx P_{measured}$ assuming the curves are completely accurate. $Q_{out}/P$ is multiplied by $P_{measured}$ in box 306, where $P_{measured}$ is provided by manometer 312, to give, $Q_{out}$. $Q_{out}$ is added to β(dP/dt) in box 316 to give an effective volumetric in-flow, $Q_{in}^{eff}$. $Q_{in}^{eff}$ is then divided by $P_{measured}$ in box 314 and the output, $Q_{in}^{eff}/P_{measured}$, is input into box 302 which, using the inverse gate valve position estimation curve, outputs a new valve position, $\theta_{new}$. $\theta_{new}$ is then used to position the valve via valve controller 310. In using this technique, the positioning of the valve is subsequently corrected using the calculated effective inflow, thereby reducing potential pressure overshoots/undershoots which may occur due to the inherent error in the curves. The loop may be repeated if necessary. Furthermore, the control loop may be used by itself to regulate pressure within processing chambers or alternatively the control loop may be used as a prepositioning step prior to handing control over to a different control scheme, such as proportional, integral and/or derivative control, as described in more detail below.

Thus, according the present invention, use of the gate position estimation curves stored in memory advantageously eliminates the need to perform a new learn procedure whenever a new process recipe is used. By using the flow and pressure set point information with the stored pumping speed correlations in the present invention, the valve prepositioning may be reliably performed even when recipe changes are incorporated. In contrast, conventional pressure control schemes often rely on saving the learned gate valve positions for each step of a recipe in memory, and simply recall these learned values for prepositioning the valve at each step. This technique works well if the same recipe is run repeatedly. However, if the recipe is modified or if a completely new recipe is used, the learned values stored in memory may not be appropriate for the new recipe. Hence, a dummy wafer is usually run at the start of each new recipe to allow the controller to learn the appropriate valve preposition values, to ensure all production wafers are processed identically. According to the present invention, these dummy wafer runs are eliminated and hence, tool productivity is improved.

In a preferred alternative embodiment of the present invention the valve is first prepositioned according to one of the above prepositioning alternatives, or simply according to a position of a previous run. After initial valve prepositioning, proportional (or proportional and derivative) control is applied until a predetermined condition is met after which integral control is also enabled. By initially applying only proportional (or proportional and derivative) control, the pressure is brought close to the desired set point with no overshoot/undershoot, without undesirable valve motion. Subsequently, integral control is enabled to reduce any steady-state difference between the set point and actual pressures. Delaying the onset of integral control effectively eliminates pressure overshoots/undershoots which result from integrator windup or integrator overshoot, caused by the nonlinearity and higher order nature of the system.

In a one alternative embodiment, the valve is initially prepositioned based on a previous run or from the above described positioning alternatives. Following the prepositioning, proportional (or proportional and derivative) control is applied until the absolute value of pressure error, $$\left| \frac{(P_{measured} - P_{set})}{P_{set}} \right|,$$

falls to below about 0.25 and preferably below 0.05, after which integral control is also enabled. This pressure error criterion for enabling integral control works very effectively, especially in cases where the valve is prepositioned based upon a previous run.

In some cases, however, the combination of valve prepositioning and proportional (or proportional and derivative) control may not achieve a pressure error small enough to trigger the onset of integral control. This sometimes happens, for example, in cases where the prepositioning is based upon an extremely inaccurate pumping speed correlation. In this situation it is advantageous to enable the integrator after a time criterion is met. This time may be estimated by measuring dP/dt and assuming dP/dt is constant, the time to reach the set point is $(dP/dt)^{-1}$ $(P_{measured})$. Another way to estimate the time to reach the set point is to use the relationship:

$$t \propto \frac{(P_{setpoint}) \times V_{chamber}}{Q_{set}}.$$

When the gate valve position estimation curve, without correction, is used to preposition the valve, time makes a good criterion for enabling integral control because of the inaccuracies that may exist in the stored pumping speed correlation. Calculating the integrator delay time in this way is advantageous over using a fixed integrator delay, because for each process step the integrator delay time can be minimized, which can increase the productivity of the tool. In addition, calculating the integrator delay in this way is advantageous over having the user specify an integrator delay time for each process step, because no operator intervention is required. Furthermore, no non-productive process cycles with dummy wafers are required to empirically determine the optimal integrator delay time. A skilled artisan will readily recognize other ways of estimating the time required to reach the pressure set point.

In another alternative embodiment, the criterion for enabling integral control is based upon the time derivative of the measured pressure. More specifically, the integral control is only enabled after the absolute value of dP/dt has decreased below about 50% of the maximum value of dP/dt recorded for the current recipe step or set point conditions. This embodiment relies on the measurement of dP/dt and the expected characteristic variation of dP/dt with time. FIG. 7 shows characteristic time traces of pressure and dP/dt following pressure set point changes from 0 to 40 to 20 mTorr at a constant flow of 200 SCCM. In this example, when the pressure set point increases from 0 to 40 mTorr, the pressure monotonically increases and subsequently levels off to the new set point, with minimal overshoot. The measured value of dP/dt initially increases, peaks, and then decreases as the measured pressure approaches set point. The peak in dP/dt typically occurs when the measured pressure is near the midpoint of the initial and final pressures. A similar trend is observed when the set point is changed from 40 to 20 mTorr, except that the sign of dP/dt is reversed.

Figure 8A:
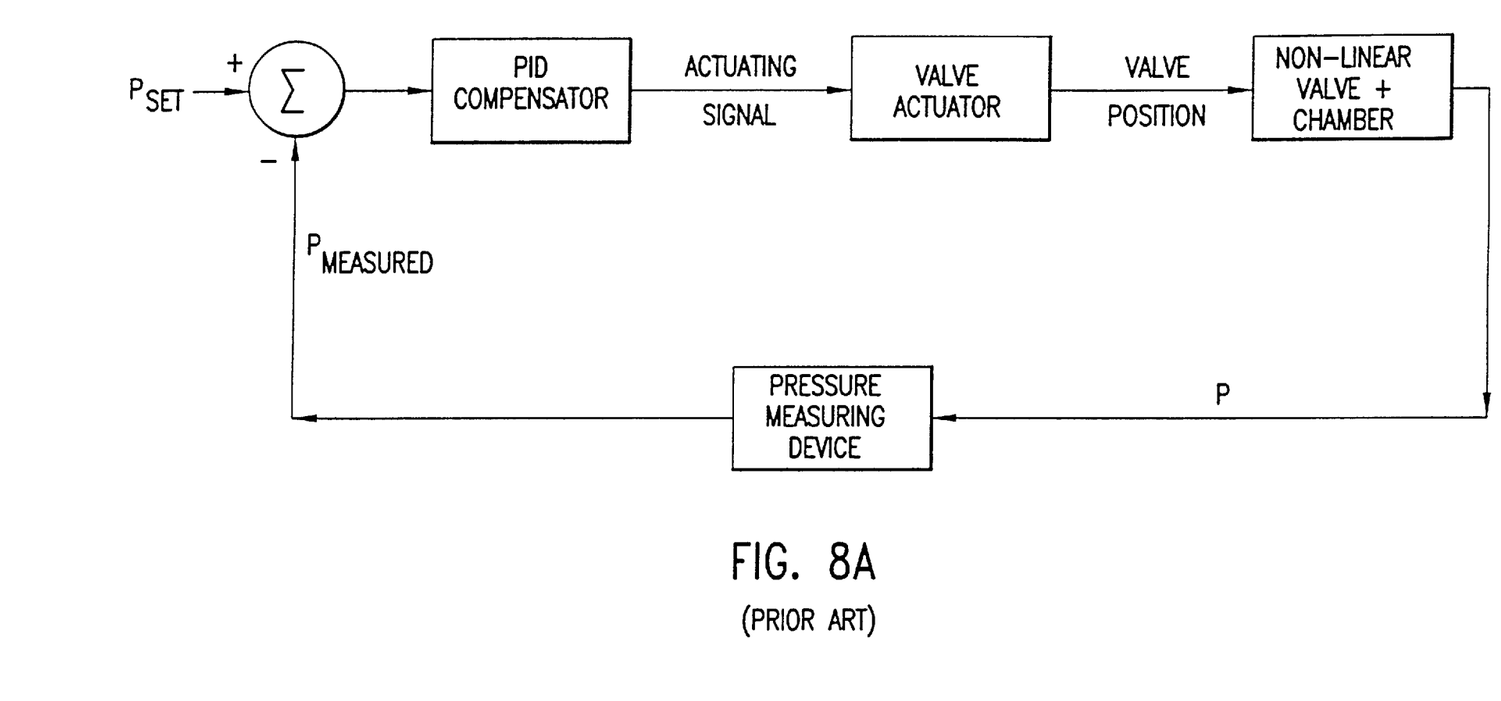
FIG. 8a shows a block diagram of a conventional, prior art, PID control formulation.

In another preferred alternative embodiment of the present invention, a novel application of cancellation compensation is utilized to reduce the nonlinearity of the overall system. FIG. 8a shows a conventional, prior art, PID block diagram formulation of a pressure control system, with the valve prepositioning logic omitted for clarity. In the conventional PID pressure control system, the pressure error is input to a PID compensation block, which generates an actuator signal that is sent to the system. The system response (in this case, pressure) is then measured, fed back and compared to the pressure set point to determine the system error. The valve actuator and the pressure measurement device, in this conventional formulation, are readily modelled as a first order system with an exponential time response. However, in this conventional formulation, it is difficult to mathematically model the complete system using standard control theory due to the nonlinearity of the valve/chamber system. The valve/chamber system, in this conventional formulation, is effectively composed of the convolution of the nonlinear (outflow) gate valve position estimation function and the integrator-like nature of the chamber (i.e., pressure in the chamber is determined by the time integral of the difference between the rates of gas inflow and outflow of the chamber).

Figure 8B:
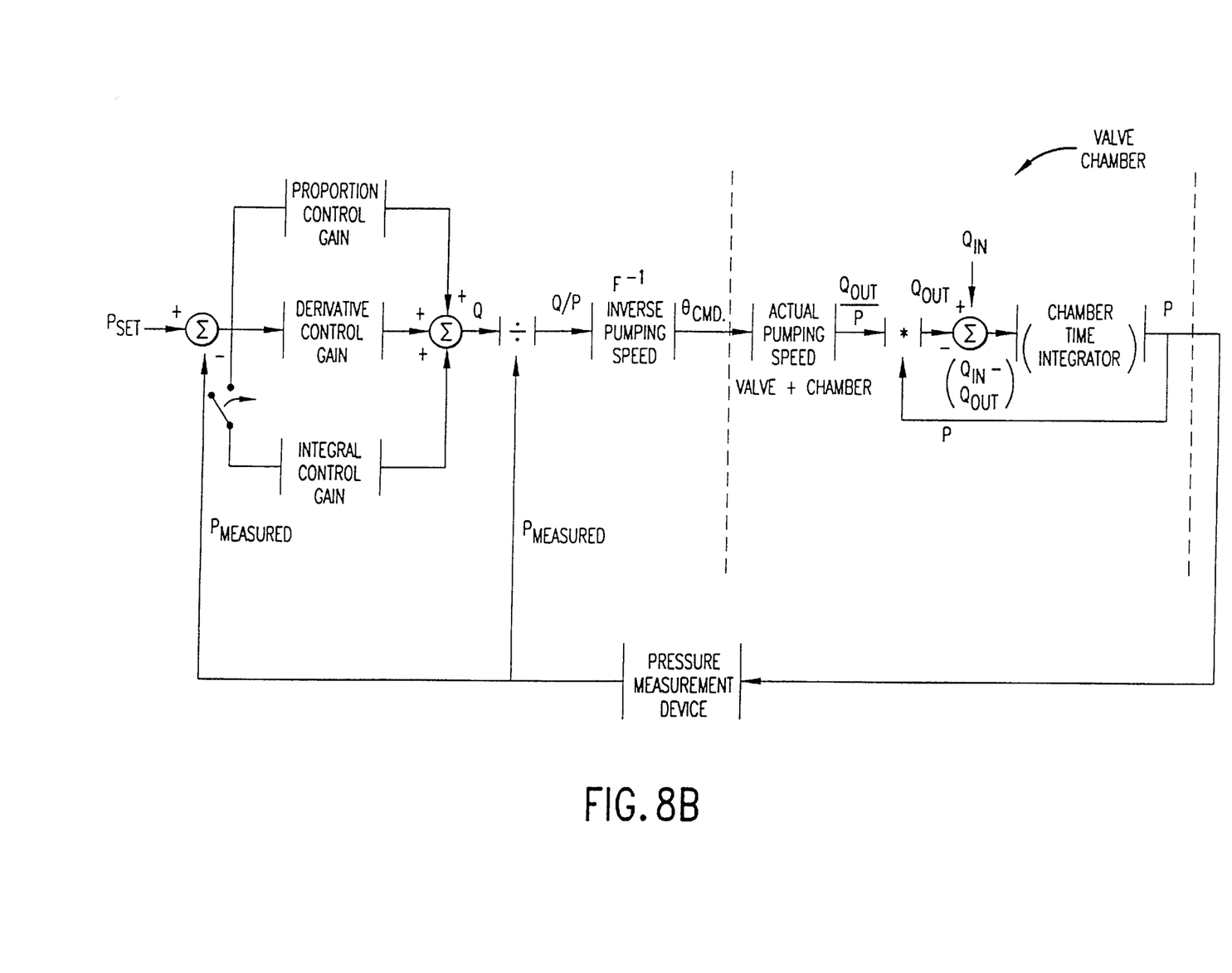
FIG. 8b shows a block diagram of a PID control formulation according to an alternative embodiment of the present invention.

Thus, in an alternative preferred embodiment of the present invention, the inverse function of the gate valve position estimation curve, $F^{-1}$, is introduced into the model, as shown in FIG. 8b, which substantially cancels the nonlinearity of the valve/chamber system. In this alternative preferred embodiment, referring to FIG. 8b, the pressure error is input to PID compensation blocks. The output of the PID compensation is effectively a volumetric flow command, Q, with units of standard cubic centimeters per minute (sccm). Q is then divided by pressure in units of mTorr (either the pressure set point or measured pressure) to calculate the quotient of Q/P. The quotient is then input to the inverse gate valve position estimation curve, $F^{-1}$, to determine the new valve position command, which is in turn input to the valve controller. When applied, the new valve position then sets the chamber outflow through the system pumping speed, e.g., mathematically modelled as the gate valve position estimation curve, F. In this formulation, the inverse gate valve position estimation curve acts as a system gain, but more importantly, acts to substantially cancel the nonlinearity of the valve/chamber system. (From a control theory standpoint, consecutive blocks in a block diagram are multiplied. The product of $F^{-1}$ and F is nominally unity; however, in reality their product is not exactly unity, due to the inherent differences between the stored and actual pumping speed correlation curves at various conditions. Forming the product of $F^{-1}$ and F is a specific implementation of a technique known as cancellation compensation in control theory. See Edward Doebelin, *Dynamic Analysis and Feedback Control* 254 (1962)) With this formulation, the system can be analyzed using standard control theory to optimize the control.

Thus, in this alternative preferred embodiment, the valve is initially prepositioned base on a previous run or from the above described prepositioning alternatives. Following the prepositioning, proportional (or proportional and derivative) control is applied until a predetermined condition is met after which integral control is enabled. This is just as previously described above, except that in this alternative preferred embodiment the inverse gate valve position estimation curve is applied to substantially cancel the nonlinearity of the valve/chamber system. While it is preferred to preposition the valve, a skilled artisan will readily recognize that proportional, integral and/or derivative control, in any combination, coupled with the inverse gate valve position curve to cancel the nonlinearity of the valve/chamber system, as disclosed herein, may be used with or without prepositioning to control pressure within the chamber. Generally, in PID formulation the optimal gain applied to proportional, integral and derivative control are determined empirically. In a Ziegler-Nicols scheme, for example, (G. F. Franklin, J. D. Powel & A. Eamami-Naeini, *Feedback Control of Dynamic Systems* 103–106 (1986)), the optimal gains can be related to the reaction rate and lag of the system response. The gains selected are usually constants or are scheduled with some parameter related to the system. In this alternative preferred embodiment is has been found experimentally that optimal pressure control is achieved by scheduling the integral gain with valve position, where the gain is given by $K_i$=(constant) $(F(\theta_{actual}))$, where F is the gate valve position estimation curve. $K_p$ and $K_d$, proportional and derivative gains respectively may be constants or scheduled with flow. Typical values for $K_p$ and $K_d$, for 200 mm wafer processing chambers, are on the order of unity, while $K_d$ is generally set to a fraction of $K_p$ (e.g., 0.1).

While the above described alternative preferred embodiments of the present invention use proportional and integral control, the skilled artisan will readily recognize that derivative control, in addition to proportion and integral control, may also be used at any time after prepositioning of the valve without exceeding the scope of the present invention. Furthermore, several ways of prepositioning the value prior to PID control have been described. The skilled artisan will readily recognize that many other ways of prepositioning the valve may be used prior to PID control without exceeding the scope of the present invention.

While preferred embodiments of the invention have been described, the descriptions are merely illustrative and are not intended to limit the present invention. For example it is to be understood that although the invention was described using an example of vacuum plasma wafer processing equipment, the invention is applicable to other types of wafer processing equipment as well as to other types of vacuum processing equipment. Thus, one of ordinary skill will recognize that the invention is equally applicable to other types of equipment where there is a need to manipulate and precisely control low, near-vacuum pressure in an evacuated chamber.

What is claimed is:

1. A method for controlling pressure in an evacuated processing chamber comprising the steps of:
   retrieving from electronic memory a desired pressure value reflecting a desired pressure level for the processing chamber;
   retrieving from electronic memory a desired gas flow value representing a desired gas flow rate through the processing chamber;
   positioning a throttle valve to an initial position, the throttle valve used to control pressure in the processing chamber;
   measuring pressure within the processing chamber;
   calculating a pressure error equal to the difference between the desired pressure and the measured pressure; and
   subsequent to said positioning step, repositioning the throttle valve at least once based on the difference between the desired pressure and the measured pressure using proportional and integral control, wherein integral control is delayed for a predetermined period.

2. The method according to claim 1, wherein the repositioning step includes using derivative control.

3. The method according to claim 1 further comprising:
   calculating the absolute value of a fractional error between the measured pressure and the desired pressure, wherein said predetermined period is established when the absolute value of the fractional pressure error falls below a preset threshold value.

4. The method according to claim 3, wherein the threshold value is less than about 0.25.

5. The method according to claim 3, wherein the threshold value is less than about 0.05.

6. The method according to claim 1 further comprising:
   estimating a time required for the chamber pressure to stabilize, wherein said predetermined period is substantially equal to the estimated time.

7. The method according to claim 6, wherein the estimated time is calculated by using the equation $$t \approx P_{desired} * V_{chamber} / Q_{desired}.$$

8. The method according to claim 6 further comprising:
   storing in electronic memory the measured pressure;
   storing in electronic memory the time at which the pressure is measured, wherein the estimated time is calculated by:
   (a) calculating the change in pressure with respect to the change in time; and
   (b) dividing the measured pressure by the change in pressure with respect to the change in time.

9. The method according to claim 1 further comprising:
   storing in electronic memory the measured pressure;
   storing in electronic memory the time at which the pressure is measured;
   calculating the change in pressure with respect to the change in time;
   storing in electronic memory the change in pressure with respect to the change in time;
   selecting the maximum absolute value of the change in pressure with respect to the change in time, wherein said predetermined period is established when the absolute value of the change in pressure with respect to the change in time falls below a preset threshold percentage of the maximum absolute value.

10. The method according to claim 9, wherein the threshold percentage is less than about 50 percent.

11. The method according to claim 1, wherein the positioning step comprises:
    accessing from electronic memory a mathematical function having a domain comprising pressures in the processing chamber and gas flow rates into the processing chamber, and having a range comprising positions of the throttle valve;
    calculating a conductance equal to the desired flow value divided by the desired pressure value; and
    positioning the throttle valve according to the mathematical function by applying the conductance to the inverse of the mathematical function accessed from electronic memory.

12. The method according to claim 11, wherein, before the positioning step, the conductance is divided by a fraction ranging from about 50 to about 150 percent.

13. The method according to claim 12, wherein the fraction has a range from about 70 to about 130 percent.

14. The method according to claim 12 further comprising:
    estimating a time required for the chamber pressure to stabilize, wherein said predetermined period is substantially equal to the estimated time.

15. The method according to claim 1, wherein the positioning step further comprises:
  retrieving the current valve position;
  retrieving from electronic memory a constant, β, equal to standard pressure, divided by the volume of the chamber, divided by standard temperature;
  accessing from electronic memory a mathematical function having a domain comprising pressures in the processing chamber and gas flow rates into the processing chamber, and having a range comprising positions of the throttle valve;
  measuring pressure and temperature within the processing chamber;
  calculating the change in pressure with respect to the change in time;
  calculating an outflow by applying the current valve position to the inverse of the mathematical function accessed from electronic memory and multiplying the result by the measured pressure;
  calculating an effective in-flow equal to the change in pressure with respect to the change in time multiplied by the constant, multiplied by the temperature of the chamber plus the outflow, $$Q_{in}^{eff} = [(dP/dt) \times \beta \times T_{chamber}] + Q_{out};$$

calculating a conductance which is equal to the effective in-flow divided by the measured pressure; and
  positioning the throttle valve according to the mathematical function by applying the conductance to the inverse of the mathematical function accessed from electronic memory.

16. A method for controlling pressure in an evacuated processing chamber comprising the steps of:
  retrieving from electronic memory a desired pressure value reflecting a desired pressure level for the processing chamber;
  retrieving from electronic memory a desired gas flow value representing a desired gas flow rate through the processing chamber;
  retrieving the current valve position;
  retrieving from electronic memory a constant, β, equal to standard pressure, divided by the volume of the chamber, divided by standard temperature;
  accessing from electronic memory a mathematical function having a domain comprising pressures in the processing chamber and gas flow rates into the processing chamber, and having a range comprising positions of the throttle valve;
  positioning a throttle valve to an initial position, the throttle valve used to control pressure in the processing chamber;
  measuring pressure and temperature within the processing chamber;
  calculating the change in pressure with respect to the change in time, dP/dt;
  calculating an outflow by applying the current valve position to the inverse of the mathematical function accessed from electronic memory and multiplying the result by the measured pressure;
  calculating an effective in-flow equal to the change in pressure with respect to the change in time multiplied by the constant, multiplied by the temperature of the chamber plus the outflow, $$Q_{in}^{eff} = [(dP/dt) \times \beta \times T_{chamber}] + Q_{out};$$

calculating a conductance which is substantially equal to the effective in-flow divided by the measured pressure; and
  positioning the throttle valve according to the mathematical function by applying the conductance to the inverse of the mathematical function accessed from electronic memory.

17. A method for controlling pressure in an evacuated processing chamber comprising the steps of:
  retrieving from electronic memory a desired pressure value reflecting a desired pressure level for the processing chamber;
  retrieving from electronic memory a desired gas flow value representing a desired gas flow rate through the processing chamber;
  positioning a throttle valve to an initial position, the throttle valve used to control pressure in the processing chamber;
  measuring pressure within the processing chamber;
  calculating the difference between the desired pressure and the measured pressure;
  calculating the change in pressure with respect to the change in time;
  storing in electronic memory the change in pressure with respect to the change in time;
  selecting the maximum absolute value of the change in pressure with respect to the change in time; and
  subsequent to said positioning step, repositioning the throttle valve based on the difference between the desired pressure and the measured pressure using proportional and integral control, wherein integral control is delayed until the absolute value of the change in pressure with respect to the change in time has decreased to below a preset threshold percentage of the selected maximum absolute value.

18. The method according to claim 17, wherein the repositioning step includes using derivative control.

19. The method according to claim 17, wherein said threshold is less than 50 percent of the selected maximum absolute value.

20. An apparatus for processing materials under a controlled low pressure environment comprising:
  a processing chamber;
  a gas introduction system in fluid communication with said processing chamber;
  a vacuum pump in fluid communication with said processing chamber configured to remove gas from said processing chamber;
  a throttle valve mounted between said processing chamber and said vacuum pump, said throttle valve positionable to regulate the rate of gas removed from said processing chamber by said vacuum pump;
  a controller for controlling the pressure in said processing chamber by directing the throttle valve to a plurality of throttle positions selected by said controller, wherein a first throttle position is pre-selected and wherein subsequent throttle positions are selected by the controller based on the difference between a desired pressure and a measured pressure using proportional and integral control, wherein the integral control is delayed for a predetermined period.

21. The apparatus of claim 20, wherein selection of subsequent throttle positions also uses derivative control.

22. The apparatus of claim 20 wherein said period is established when the absolute value of a fractional error between the measured pressure and the desired pressure is less than about 0.25.

23. The apparatus of claim 20, wherein said period is established when the absolute value of a fractional error between the measured pressure and the desired pressure is less than about 0.05.

24. The apparatus of claim 20 wherein said period is substantially equal to the estimated time required for the chamber pressure to stabilize.

25. The apparatus of claim 20, wherein said predetermined period is established when the absolute value of the change in pressure with respect to the change in time is less than about 50 percent of a maximum absolute value of the change in pressure with respect to the change in time.

26. A method for controlling pressure in an evacuated processing chamber comprising the steps of:
   retrieving from electronic memory a desired pressure value reflecting a desired pressure level for the processing chamber;
   retrieving from electronic memory a desired gas flow value representing a desired gas flow rate through the processing chamber;
   accessing from electronic memory a mathematical function having a domain comprising pressures in the processing chamber and gas flow rates into the processing chamber, and having a range comprising positions of the throttle valve;
   measuring pressure within the processing chamber;
   calculating a pressure error equal to the difference between the desired pressure and the measured pressure; and
   positioning the throttle valve by repeating the steps:
      (a) retrieving from electronic memory proportional, integral and derivative gains, wherein at least one of said gains is not equal to zero;
      (b) calculating a proportional compensation of the valve position, an integral compensation of the valve position and a derivative compensation of the valve position by applying the pressure error to the proportional gain, the integral gain and the derivative gain respectively;
      (c) summing the outputs from step (b) to provide a value representing volumetric flow rate;
      (d) dividing the volumetric flow rate value by a pressure value to give a quotient representing flow/pressure;
      (e) applying the quotient to the inverse of the mathematical function accessed from electronic memory to provide a new valve position; and
      (f) repositioning the valve position to the new valve position.

27. The method according to claim 26, wherein the pressure value is the desired pressure.

28. The method according to claim 26, wherein the pressure value is the measured pressure.

29. The method according to claim 26, wherein the integral gain is set to substantially zero for a predetermined period.

30. The method according to claim 29, further comprising:
   retrieving a current value for the valve position; and
   wherein after the predetermined period said integral gain is determined by applying the current valve position to the mathematical function accessed from electronic memory and multiplying the result by a constant.

31. The method according to claim 29 further comprising:
   setting the valve to an initial position prior to said position step.

32. The method according to claim 29, wherein said positioning step further comprises:
   calculating the absolute value of a fractional error between the measured pressure and the desired pressure, wherein said predetermined period is established when the absolute value of the fractional pressure falls below a preset threshold value.

33. The method according to claim 32, wherein the threshold value is less than about 0.25.

34. The method according to claim 32, wherein the threshold value is less than about 0.05.

35. The method according to claim 29, wherein said positioning step further comprises:
   estimating a time required for the chamber pressure to stabilize, wherein said predetermined period is substantially equal to the estimated time.

36. The method according to claim 35 further comprising:
   storing in electronic memory the measured pressure;
   storing in electronic memory the time at which the pressure is measured, wherein the estimated time is determined by calculating the change in pressure with respect to the change in time and dividing the measured pressure by the change in pressure with respect to the change in time.

37. The method according to claim 29, wherein the estimated time is calculated by using the equation $$t \approx P_{desired} * V_{chamber} / Q_{desired}.$$

38. The method according to claim 29 further comprising:
   storing in electronic memory the measured pressure;
   storing in electronic memory the time at which the pressure is measured;
   calculating the change in pressure with respect to the change in time;
   storing in electronic memory the change in pressure with respect to the change in time;
   selecting the maximum absolute value of the change in pressure with respect to the change in time, wherein said predetermined period is established when the absolute value of the change in pressure with respect to the change in time falls below a preset threshold percentage of the maximum absolute value.

39. The method according to claim 38, wherein the threshold percentage is less than about 50 percent.

* * * * *